US010936868B2

(12) United States Patent
Short et al.

(10) Patent No.: US 10,936,868 B2
(45) Date of Patent: Mar. 2, 2021

(54) METHOD AND SYSTEM FOR CLASSIFYING AN INPUT DATA SET WITHIN A DATA CATEGORY USING MULTIPLE DATA RECOGNITION TOOLS

(71) Applicant: Booz Allen Hamilton Inc., McLean, VA (US)

(72) Inventors: Nathaniel Jackson Short, Annapolis, MD (US); Jonathan M. Levitt, Boston, MA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 16/791,675

(22) Filed: Feb. 14, 2020

(65) Prior Publication Data
US 2020/0302169 A1    Sep. 24, 2020

Related U.S. Application Data

(60) Provisional application No. 62/824,880, filed on Mar. 27, 2019, provisional application No. 62/820,689, filed on Mar. 19, 2019.

(51) Int. Cl.
*G06K 9/00* (2006.01)
*G06K 9/62* (2006.01)
*G06T 7/70* (2017.01)

(52) U.S. Cl.
CPC ..... *G06K 9/00624* (2013.01); *G06K 9/00302* (2013.01); *G06K 9/00335* (2013.01);
(Continued)

(58) Field of Classification Search
CPC ............. G06K 9/6256; G06K 9/00248; G06K 9/00818; G06K 9/6257; G06K 9/6282;
(Continued)

(56) References Cited

U.S. PATENT DOCUMENTS 6,219,640 B1    4/2001  Basu et al.
2003/0184468 A1   10/2003  Chen et al.
(Continued)

OTHER PUBLICATIONS

The Examiner's attention is directed to co-pending US application, U.S. Appl. No. 16/791,740, filed Feb. 14, 2020.
(Continued)

*Primary Examiner* — Alex Kok S Liew
(74) *Attorney, Agent, or Firm* — Buchanan Ingersoll & Rooney PC (57) ABSTRACT

A computer-implemented method and system are disclosed for classifying an input data set within a data category using multiple data recognition tools. The method includes identifying at least a first attribute and a second attribute of the data category; classifying the at least first attribute via at least a first data recognition tool and the at least second attribute via at least a second data recognition tool, the classifying including: allocating a confidence factor for each of the at least first and second attributes that indicates a presence of each of the at least first and second attributes in the input data set; and combining outputs of the classifying into a single output confidence score by using a weighted fusion of the allocated confidence factors.

17 Claims, 9 Drawing Sheets

(52) U.S. Cl.
CPC .............. *G06K 9/6292* (2013.01); *G06T 7/70* (2017.01); *G06T 2207/20084* (2013.01)

(58) Field of Classification Search
CPC .............. G06K 9/3241; G06K 9/4619; G06K 2009/6294; G06K 9/00268; G06K 9/4614; G06K 9/6217; G06K 9/6227; G06K 9/6228; G06K 9/6234; G06K 9/6262; G06K 9/6277; G06K 9/6292; G06K 9/00281; G06K 9/00744; G06K 9/4671; G06K 9/468; G06K 9/6267
See application file for complete search history.

(56) References Cited

U.S. PATENT DOCUMENTS

| | | | |
|---|---|---|---|
| 2005/0213810 A1* | 9/2005 | Sabe | G06K 9/6282 382/159 |
| 2005/0254996 A1 | 11/2005 | Haupt et al. | |
| 2005/0286772 A1* | 12/2005 | Albertelli | G06K 9/6292 382/224 |
| 2008/0226151 A1 | 9/2008 | Zouridakis et al. | |
| 2008/0260212 A1* | 10/2008 | Moskal | G06K 9/00315 382/118 |
| 2011/0040710 A1 | 2/2011 | Connell | |
| 2012/0194662 A1 | 8/2012 | Zhang et al. | |
| 2013/0132311 A1* | 5/2013 | Liu | G06K 9/00718 706/12 |
| 2017/0160813 A1 | 6/2017 | Divakaran et al. | |
| 2018/0139104 A1 | 5/2018 | Seddigh et al. | |
| 2019/0221213 A1 | 7/2019 | Shah et al. | |
| 2019/0258878 A1 | 8/2019 | Koivisto et al. | |

OTHER PUBLICATIONS

Etemad, et al., "Discriminant analysis for recognition of human face images", J. Opt. Soc. Am., Aug. 1997, vol. 14, No. 8, pp. 1724-1733.

Liu, et al., "Comparative Assessment of Independent Component Analysis (ICA) for Face Recognition", Second International Conference on Audio- and Video-based Biometric Person Authentication, Mar. 1999, pp. 1-6.

Liu, et al., "Face Recognition Using Evolutionary Pursuit", Fifth European Conference on Computer Vision, Jun. 1998, 17 pages.

M. Soltane et al., "Multi-Modal Biometric Authentications: Concept Issues and Applications Strategies", International Journal of Advanced Science and Technology, Nov. 2012, pp. 1-38, vol. 48.

International Search Report and Written Opinion of the International Searching Authority (Forms PCT/ISA/220, PCT/ISA/210 and PCT/ISA/237) dated May 22, 2020, by the International Bureau of U.S Patent and Trademark Office in corresponding International Application No. PCT/US20/20362. (16 pages).

\* cited by examiner

METHOD AND SYSTEM FOR CLASSIFYING AN INPUT DATA SET WITHIN A DATA CATEGORY USING MULTIPLE DATA RECOGNITION TOOLS

CROSS-REFERENCE TO RELATED APPLICATIONS

This application claims priority to provisional Application No. 62/824,880 filed Mar. 27, 2019 and provisional Application No. 62/820,689 filed Mar. 19, 2019.

STATEMENT REGARDING FEDERALLY-SPONSORED RESEARCH OR DEVELOPMENT

This invention was made with U.S. Government support under contract No. DHS S&T//140D7018C0004 awarded by the Department of the Interior. The U.S. Government has certain rights in this invention.

FIELD

The present disclosure relates to a system and method for classifying an input data set within a data category using multiple data recognition tools.

BACKGROUND INFORMATION

Data quality (e.g., the resolution/illumination of images; or the amount of noise in an audio file; etc.) can depend on many factors, such as the modality from which the data is sourced (e.g., cameras, microphones, or text from controlled and uncontrolled social media sources), and the type of data.

Data quality can drive the confidence in automated machine learning algorithm decisions. It can have a significant impact on the performance of trained machine learning models. For example, low quality data input drastically increases the number of errors observed from a classification algorithm. Aspects of the present disclosure provide technical solutions to address challenges that arise in machine learning algorithm decisions due to low data quality.

SUMMARY

A computer-implemented method for identifying an image or object by classifying an input data set of attributes within a data category using multiple data recognition tools is disclosed. The method includes identifying at least a first attribute and a second attribute of the data category; classifying the at least first attribute via at least a first data recognition tool and the at least second attribute via at least a second data recognition tool, the classifying including allocating a confidence factor that indicates a confidence regarding the presence and identification of each attribute in the input data set; and combining outputs of the classifying into a single output confidence by using a weighted fusion of the allocated confidence factors to indicate a confidence that the input data set (i.e., image or object) has been classified correctly according to data category. For example, a data category could be a general category of faces or could be a specific category of the face of a specific individual.

A system for identifying an image or object by classifying an input data set of attributes within a data category using multiple data recognition tools is disclosed. The system includes an identification module configured to identify at least a first attribute and a second attribute of the data category; a classification module configured to classify the at least first attribute via at least a first data recognition tool and the at least second attribute via at least a second data recognition tool, the classification including allocating a confidence factor for each of the at least first and second attributes that indicates a confidence regarding the presence and identification of each of the at least first and second attributes in the input data set; and a combination module configured to combine outputs of the classifying into a single output confidence by using a weighted fusion of the allocated confidence factors to indicate a confidence that the input data (i.e., image or object) has been classified correctly according to data category.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

DETAILED DESCRIPTION

Figure 1:
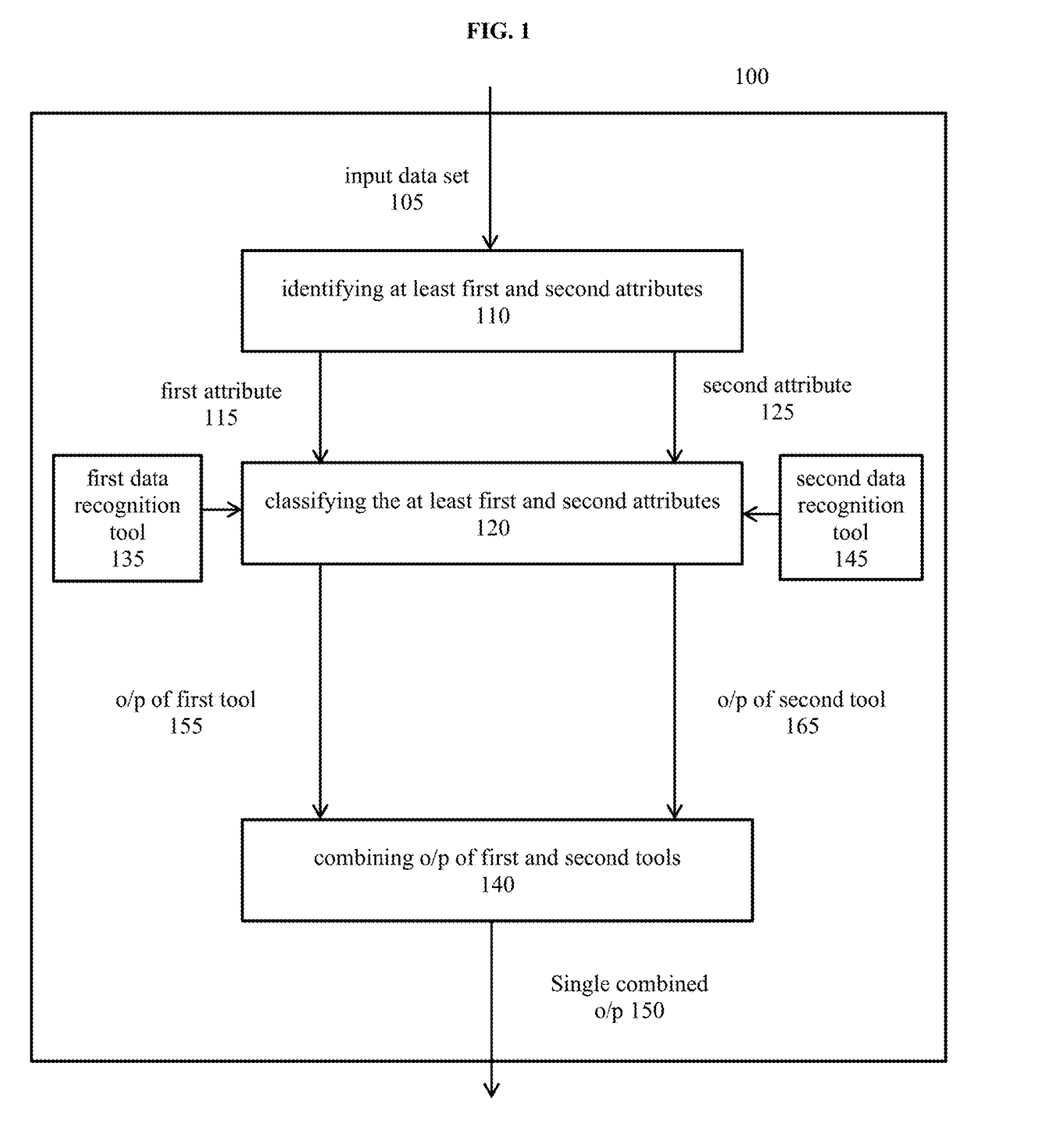
FIG. 1 shows an exemplary flowchart for a method for classifying an input data set within a data category using multiple data recognition tools.

FIG. 1 shows an exemplary method 100 for classifying an input data set 105 within data categories of attribute types using multiple data recognition tools. The input data set 105 can be any type of data, such as one or more types of biometric data, acoustic data, behavioral characteristics data, or any combination of such types. The data categories of attribute types can be any categorization (e.g., a sub-set) of the input data set 105. For example, if the input data set 105 is biometric data, the one or more data categories can be facial image, fingerprints, iris, palm, hand geometry, DNA (deoxyribonucleic acid), etc.

In other exemplary embodiments, the input data set 105 can be acoustic data and the data categories of attribute types can be audio pitch, tone, loudness, timbre, etc. The input data set 105 can be behavioral characteristics data and the data categories can be gait, signature, or typing rhythm, etc.

In an exemplary embodiment, the method 100 can include a step 110 of identifying at least a first attribute 115 and a second attribute 125 of one or more data categories of attribute types. For example, if a data category is a facial image, then the attribute (e.g. 115, 125) can be a facial expression, pose, partial image, image contrast, illumination, tone, image pitch, pose, perspective for the image of the face.

In an exemplary embodiment, the method 100 can include a step 120 of classifying the at least first attribute 115 via at least a first data recognition tool 135 and the at least second attribute 125 via at least a second data recognition tool 145, the classifying step 120 including allocating a confidence factor (e.g., a match score as described herein) that indicates a presence and identification of each attribute (e.g., 115, 125) in the input data set 105. Of course, any number of data recognition tools for any number of designated attributes can be used.

In an exemplary embodiment, the method 100 can include a step 130 of combining outputs (e.g., 155, 165) of the classifying 120 into a single output confidence 140 by using a weighted fusion of the allocated confidence factors, as described in detail herein. The single output confidence 140 can be provided on a physical data interface (e.g., a computer (AI) interface, a graphical user interface, or other physical interface), or used as an input for other applications, or generating reports, etc.

In an exemplary embodiment, the data recognition tools (e.g., 135, 145) can be selected by a user, or alternately the selection can be done automatically based on the attribute. For example, the first data recognition tool 135 can automatically be selected to be a logistic regression algorithm if the first attribute 115 is a facial expression, or any other suitable and desired algorithm. Alternately, the first data recognition tool 135 can automatically be selected to be a neural network algorithm if the first attribute 115 is an illumination of a facial image. Similarly, the second data recognition tool 145 can be based on the second attribute type.

In an exemplary embodiment, a user can select the first data recognition tool 135 to be based on a logistic regression algorithm, and the second data recognition tool 145 to be based on a neural network algorithm. Any other known algorithm can of course, be used, and/or a combination of algorithms can be used for different data recognition tools and outputs of these algorithmic approaches can be combined in weighted manner, as described herein.

In an exemplary embodiment, a confidence factor can indicate a confidence with which the input data set 105 has been properly classified by the at least first recognition tool 135 or the at least second data recognition tool 145. Thus, as disclosed herein, solutions are disclosed for combining confidence values represented, for example, as match scores for one or more attributes from a set of algorithms (e.g., 135, 145) run on plural data recognition tools (e.g., 135, 145) against the same input data set 105 (e.g., in a base case, a single attribute can be run on multiple recognition tools to determine the single output). The confidence values, or scores, from the plural (i.e., 2 or more) data recognition tools can be combined, or "fused," as disclosed herein through machine learning based on measured quality and data attributes that are known to impact matchers.

An exemplary use-case can include fusing biometric match scores with quality information. Alternative embodiments can be extended to fuse information from alternative data sources to increase decision confidence, such as, for example, class probabilities generated from disparate object recognition models applied to multi-spectral bands.

In an exemplary embodiment, the confidence factor (e.g., a match score) can be allocated on a spectrum scale from 0 to 1 (e.g., a value between 0 and 1, where 0 represents the lowest level of confidence and 1 represents the highest level). For example, in a case where the data category is facial image and the attribute is illumination, the confidence factor can be 0 if there is a lack of illumination (e.g., a dull image). Whereas, if there is extensive illumination (e.g., a bright image), the confidence factor can be 1.

In an exemplary embodiment, the confidence factor can be allocated on a binary value scale (e.g., 0 representing no-confidence and 1 representing full-confidence). For example, in a case where the data category is iris image and the attribute is green color of the iris image, the confidence factor can be 0 when the iris image color is black (or any color except green). If the iris image color is green, the confidence factor can be 1.

In an exemplary embodiment, the confidence factor can be allocated using known systems. For example, if the data category is facial image, then a face verification system such as the known VeriLook SDK 1.1 from Neurotechnology Inc., or other suitable system, can be used. Similarly, if the data category is audio data, then VoiceKey SDK from SpeechPro Inc., or other suitable system, can be used.

Figure 2:
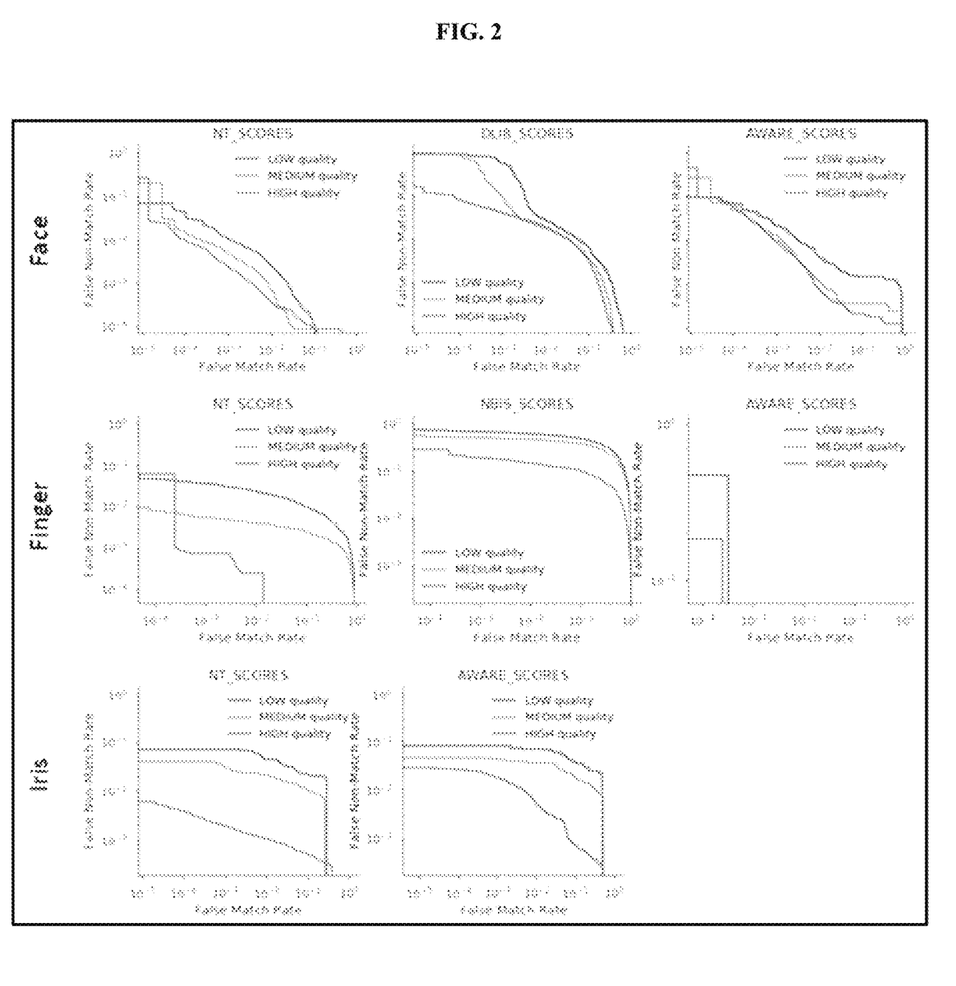
FIG. 2 illustrates an exemplary effect of quality of an input data set on detection-error tradeoff curves.

FIG. 2 shows an exemplary effect of the quality of an input data set (e.g. facial image) on the detection-error tradeoff curves computed on a representative data using different algorithms for three separate levels of sample quality. The scores generated for face, three for finger and two for iris matching, indicate a similar trend across all modalities and software. The quality of the input data set 105 can be obtained using known techniques (e.g., Neurotechnology, VeriLook quality measure or other suitable system).

In an exemplary embodiment, this quality can depend on the attributes of an individual (e.g., age, complexion, facial hair, emotional state, etc.), and the quality of the sample collected (e.g., pixel resolution, contrast, saturation, grayscale density, etc.). Therefore, part of the presently disclosed multi-algorithm fusion strategy is to weight the confidence of a classifying match score based on the quality of the input data set (e.g., 105) and its attributes (e.g., 115, 125) as represented by the confidence factor for each attribute.

In an exemplary embodiment, as the confidence factor indicates a presence and identification of each attribute in the input data set 105, the confidence factor is based on a quality of the input data set 105. A correct determination of a presence and identification of an attribute in an input data set can depend on the quality of the data.

In an exemplary embodiment, the step 130 can implement a multi-algorithm fusion approach for fusing the aforementioned match scores. This approach can be based on Logistic Regression that can be selected because of its interpretability and compatibility with large datasets. Additionally, Logistic Regression can be computationally efficient for combining larger feature sets, as with combining match scores and quality attributes to make match/non-match decisions.

In an exemplary embodiment, logistic regression classifiers can use linear regression techniques to model relationships between different variables of input data prior to building a classification model. Linear regression can provide outputs that are real numbers. For inferring whether an output of regression belongs to one class (e.g., category) or the other, logistic or logit transformation can be used as described herein.

In an exemplary embodiment, the logit function maps $[-\infty,\infty]$ to $[0,1]$. The logistic regression model can take the following form:

$$\hat{p}_i(S) = w_0 + \sum_{j=1}^{N} w_j S_{ij} \text{ and } \hat{y}_i(S) = \begin{cases} 1, & \frac{1}{1+e^{-\hat{p}_i(S)}} \geq 0.5 \\ 0, & \frac{1}{1+e^{-\hat{p}_i(S)}} < 0.5 \end{cases},$$

where $w \in w_0, w_1, \ldots, w_N$ are the parameters of the logistic regression model.

In an exemplary embodiment, to train the logistic regression model, i.e., estimate the parameters w, the following exemplary cost function is to be minimized:

$$J(w) = -\frac{1}{m} \sum_{i=1}^{N} \left[ y_i \log\left(\frac{1}{1+e^{-\hat{p}_i(S)}}\right) + (1-y_i) \log\left(\frac{e^{-\hat{p}_i(S)}}{1+e^{-\hat{p}_i(S)}}\right) \right] + \lambda L(w),$$

where $y_i \in \{0,1\}$, and $L(w)$ represents the magnitude of the model parameter vector w, and $\lambda$ represents the regularization parameter. An exemplary choice of $L(w)$ can be $\|w\|_1$ and $\|w\|_2$, where $\|w\|_1$ represents the absolute sum of the individual weights and $\|w\|_2$ represents the square root of the sum of the squares of individual weights.

In an exemplary embodiment, logistic regression classifier can be efficiently trained and inferred for high-dimensional feature problems with large sample size. The regularization parameter $\lambda$ can allow for a tradeoff between overfitting the training data and generalizability to unseen data. As $\lambda$ increases, the model has low variance and high bias. Because this model uses a linear kernel inherently for regression, it can provide a low variance and stable model.

In an exemplary embodiment, a machine learning approach can be implemented to improve decision confidence for the step 130, such that each data recognition tool (e.g., 135, 145) can be based on an algorithm for known performance against quality attributes. As such, an enhanced (e.g., optimal) match score can be obtained from comparing a pair of samples (e.g., a pair of facial images) under a data category (e.g., biometric), by combining different match scores furnished by different algorithms.

Results for an exemplary multi-algorithm fusion evaluation are shown in Table 1 below. In these results, a lower Area Under the Curve (AUC) indicates a better performing algorithm. AUC provides a good metric for evaluating performance of a classification across a range of false positive/false negative operating thresholds.

Table 1 shows Area Under the Curve (AUC) performance of a biometric system based on decisions from unimodal match scores and fused match scores for face, finger, and iris modalities using a variety of matching algorithms. A baseline fusion method (sum score fusion) is reported alongside logistic regression-based fusion using normalized scores as well as normalized scores and quality attributes.

| Method | AUC Face | AUC Finger | AUC Iris |
|---|---|---|---|
| AWARE | 0.01% | 9.66% | 0.02% |
| NT | 0.01% | 0.02% | 0.15% |
| DLIB | 0.30% | N/A | N/A |
| NBIS | N/A | 8.88% | N/A |
| Baseline | 0.01% | 0.02% | 0.06% |
| Score Fusion | 0.00% | 0.02% | 0.10% |
| Score + Quality Fusion | 0.00% | 0.01% | 0.09% |

Based on these results, multi-algorithm score fusion for face demonstrates improved matching performance over unimodal matching when looking at the AUC. Score fusion with quality attributes further improves fusion over just simply combining match scores. While Neurotechnology performance does exhibit a lower False Non-Match Rate (FNMR), the rate at which two matching samples are misclassified as not matching, at low False Match Rate (FMR), the rate at which two non-matching samples are misclassified as matching, overall operating performance is improved. This reduction in FNMR is observed for face and finger modalities, however, not with the iris dataset. Part of the reason for this could be attributed to the fact that the data contained within the iris dataset is of good quality.

Figure 3:
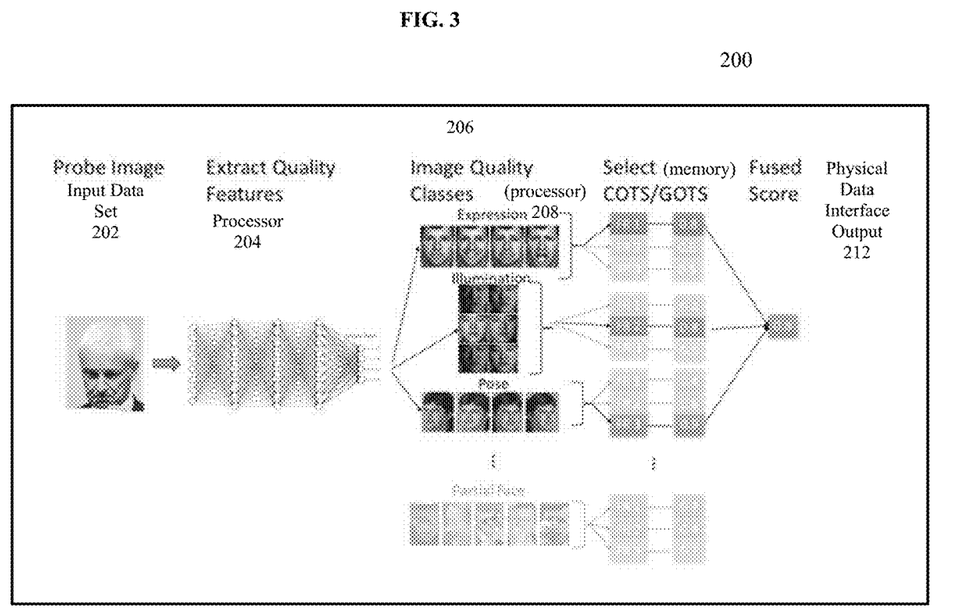
FIG. 3 depicts an exemplary facial image where an off-angle face with variable lighting and expression is detected.

FIG. 3 shows an exemplary quality-aware framework/workflow where degradation in data (image) quality can be quantified to select biometric recognition algorithms based on known robustness to degradation attributes identified. This quality-driven framework can allow for dynamic workflow adjustment, by automatically evaluating biometric data and selecting an appropriate algorithm based on prior performance profiles. Here, an input face image can belong to multiple image quality classes and therefore result in a weighted fusion of scores that are determined based on the quality rating within each class.

The example of FIG. 3 shows a face where an off-angle face with variable lighting and expression is detected. Face Recognition (FR) algorithm 1 (e.g., Independent Component Analysis) can be selected because of robustness to expression, FR 2 (e.g., Linear Discriminant Analysis) for robustness to illumination, and FR 3 (e.g., eigenspace-based) for robustness to pose. The FR algorithms can generate a match score based on a quality of an image. For example, the match score can be on a scale on 0 (denoting the worst quality) to 1 (denoting the best quality).

Further details of the aforementioned FR algorithms can be found in 1) C. Liu, H. Wechsler, Comparative Assessment of Independent Component Analysis (ICA) for Face Recognition, Proc. of the Second International Conference on Audio- and Video-based Biometric Person Authentication, AVBPA'99, 22-24 Mar. 1999, Washington D.C., USA; 2) K. Etemad, R. Chellappa, Discriminant Analysis for Recognition of Human Face Images, Journal of the Optical Society of America A, Vol. 14, No. 8, August 1997; and 3) C. Liu, H. Wechsler, Face Recognition Using Evolutionary Pursuit, Proc. of the Fifth European Conference on Computer Vision, ECCV'98, Vol II, 2-6 Jun. 1998, Freiburg, Germany. All of these references are incorporated in their entirety herein by reference.

In an exemplary embodiment, the match scores can be fused by a previously trained model (e.g., trained with a test input data set) into a final system score. This correlation between quality attributes and match performance can be learned through Deep Learning architecture or through other machine learning approaches, such as Linear Regression, neural networks, and/or other known techniques.

In an exemplary embodiment, the ability to measure the quality of, for example, a biometric input sample and weight the confidence of the match score accordingly can be performed for biometric fusion. By correlating match rates from multiple known matchers for finger, face, and iris biometrics to biometric image quality, a "quality-aware" workflow can be accomplished where an algorithm(s) is selected based on a prior knowledge of how it performs on similar images.

Figure 4:
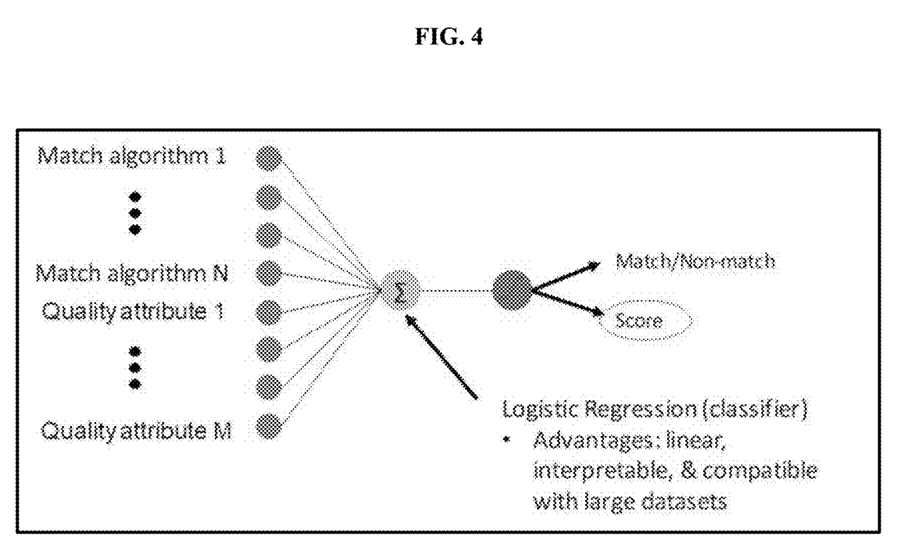
FIG. 4 illustrates an exemplary logistic regression approach to combine confidence factors (i.e., match scores) and quality attributes.

FIG. 4 illustrates an exemplary logistic regression approach to combine match scores and quality attributes to generate a probability of match/non-match based on all the data generated during the template creation process. Here a classifier can be trained by combining scores from multiple matching algorithms along with a set of quality attributes through logistic regression.

In an exemplary embodiment, quality attributes of the probe (unidentified) sample can be included because the gallery (known reference used to identify unidentified samples) image being compared to is already of good quality. This may not always be the case and further evaluation can be performed using the gallery quality attributes as well. The regression model learns a set of weights that optimally combines a large set of attributes to generate a predicted class and a confidence level (score) associated with the prediction.

Figure 5:
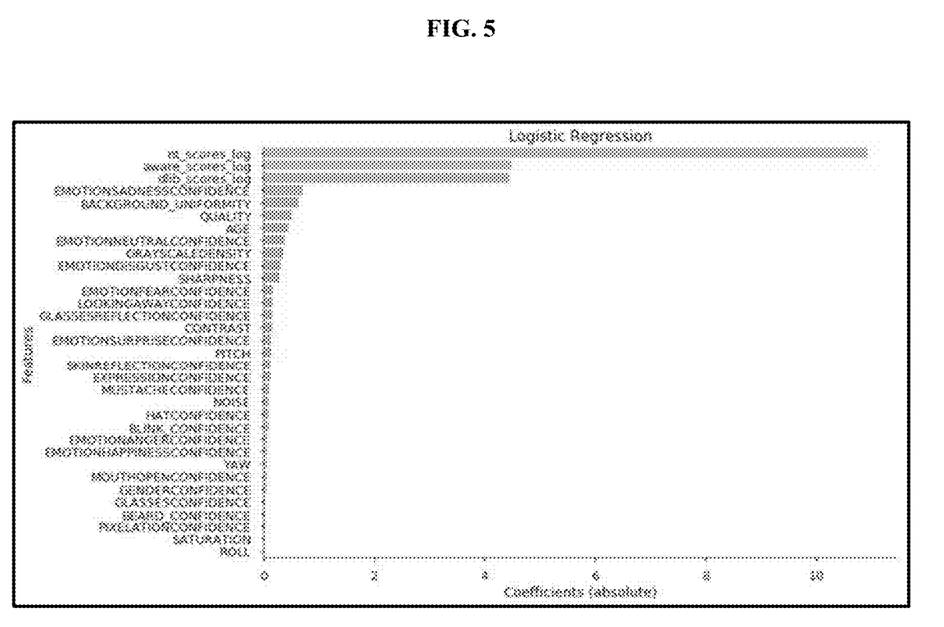
FIG. 5 shows exemplary coefficients found to combine confidence factors/match scores and feature attributes using Logistic Regression.

FIG. 5 shows exemplary coefficients, or numerical quantity used to modify a sample, found to combine scores and feature attributes using a Logistic Regression multi-algorithm fusion method. The absolute value coefficients are shown for each score and attribute, providing an indication of the predictive power of each quality attribute.

Figure 6:
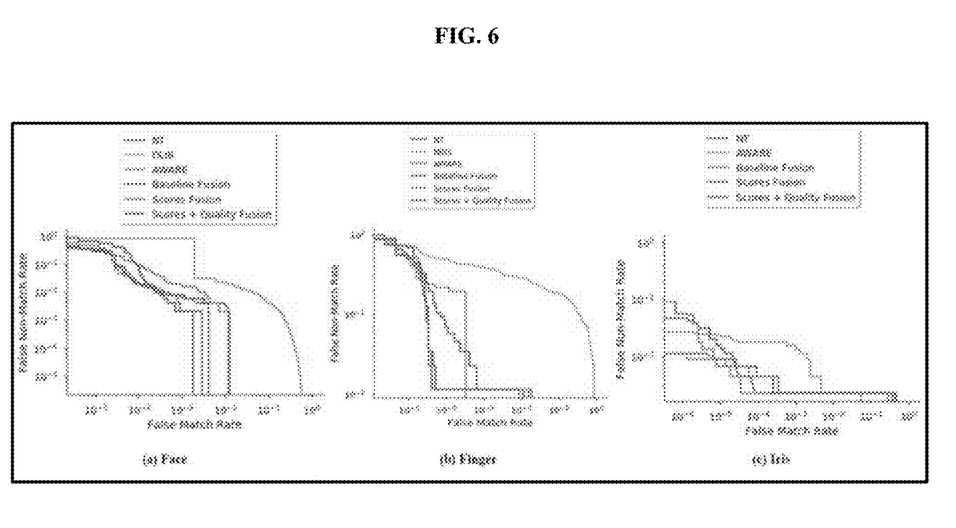
FIG. 6 illustrates exemplary (a) Face, (b) Finger and (c) Iris Multi-Algorithm Fusion Detection Error Trade-off (DET) Curves.

FIG. 6 shows exemplary (a) Face, (b) Finger and (c) Iris Multi-Algorithm Fusion Detection Error Trade-off (DET) Curves for unimodal and fused system performance as the measured False Non-Match Rate (FNMR) decreases. A well-performing system will trend to the lower left of the graph (0,0) indicating low FNMR performance at low False Match Rates. The shaded region around each curve indicates the confidence bounds as found using a Subset Bootstrapping method or a resampling technique used to estimate statistical distributions of small datasets.

In an exemplary embodiment, scores can be generated from different algorithms, such as, for face, finger and iris modalities. For example, Baseline Fusion can perform a sum score fusion, Scores Fusion can be a fusion of match scores only using Logistic Regression, and Scores+Quality Fusion can perform Logistic Regression fusion of the match scores and quality attributes.

Figure 7:
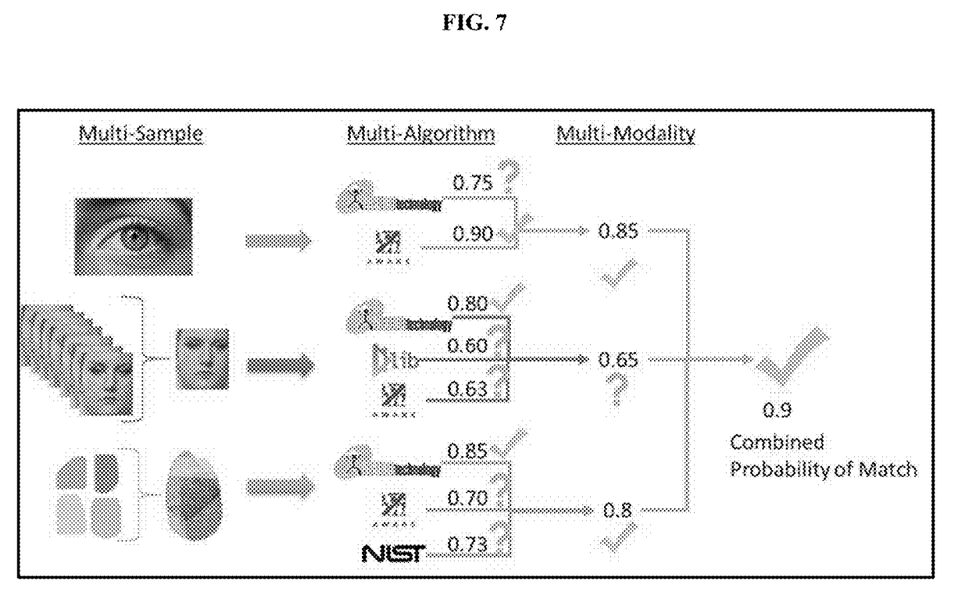
FIG. 7 shows exemplary multi-sample fusion to combine multiple instances of, for example, the same input data set.

FIG. 7 shows exemplary multi-sample fusion to combine multiple instances of, for example, the same input data set (e.g., biometric at the image or attribute level) using weighted outputs of multiple data recognition tools. This can be done by aligning and combining 2-D images to improve quality, stitching multiple views of a face through 3-D reconstruction, or combining multiple, partial fingerprint regions into a larger composite image.

In an exemplary embodiment, the multi-algorithm fusion can be implemented as a system for combining probabilities of multiple machine learning algorithms within the multiple data recognition tools through quality attribute analysis, combining the outputs from different matching algorithms applied to the same biometric sample based on modeled performance and measured quality attributes. For example, combining the score outputs from Neurotechnology and AWARE iris matchers tools into a single, higher confidence score, so that each modality has only one match score.

In an exemplary embodiment, the single modality scores through multi-modal score fusion can be combined via a system for quality-driven, multi-source data fusion to improve machine learning decision confidence, combining the match scores and quality from each independent modality to increase the confidence in a multi-modal comparison.

In an exemplary embodiment, this approach can be extensible beyond the imaging domain to applications such as human identification or object recognition based on imaging data or acoustics or any combination thereof. For example, combining multiple speaker verification algorithm scores based on quality attributes of audio, or combining multiple vehicle recognition algorithms based on acoustic measurements and quality attributes. For example, exemplary embodiments can be configured for speaker authentication.

Figure 8:
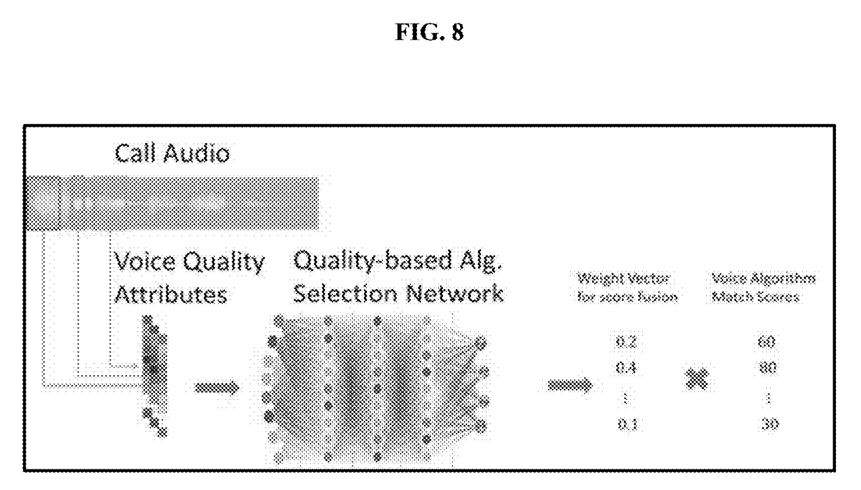
FIG. 8 illustrates an exemplary method for classifying being applied to audio files.

FIG. 8 illustrates an example of this approach applied to processing audio files for speaker verification wherein an input audio call is analyzed with respect to select voice quality attributes, and then processed as decibels herein using plural quality-based algorithms contained in a selection network. As already described, outputs of the algorithm network can be supplied via a weight vector for score fusion to provide a single output.

In an exemplary embodiment, to improve voice matching accuracy, exemplary embodiments can adaptively combine outputs from complementary voice vendor algorithms based on modeling correlations between descriptive and quality attributes of input data and performance. Using machine learning models, such as neural networks or logistic regression, utterances can be identified that are better suited for specific algorithms based on various prosodic features, indicating quality, such as word duration, signal to noise, frequency, jitter, shimmer, etc., or other attributes, such as gender, dialect, age, device type.

Exemplary embodiments can be used in image fusion from electro-optical/infrared (EO/IR) satellite imagery or other ISR platforms, and used, for example, to improve object detection and recognition for obstacle avoidance in self driving vehicles, track, detect and identify human subjects, vehicles and other objects from overhead and ground based cameras for event crowd monitoring, retail or other commercial building security.

Figure 9:
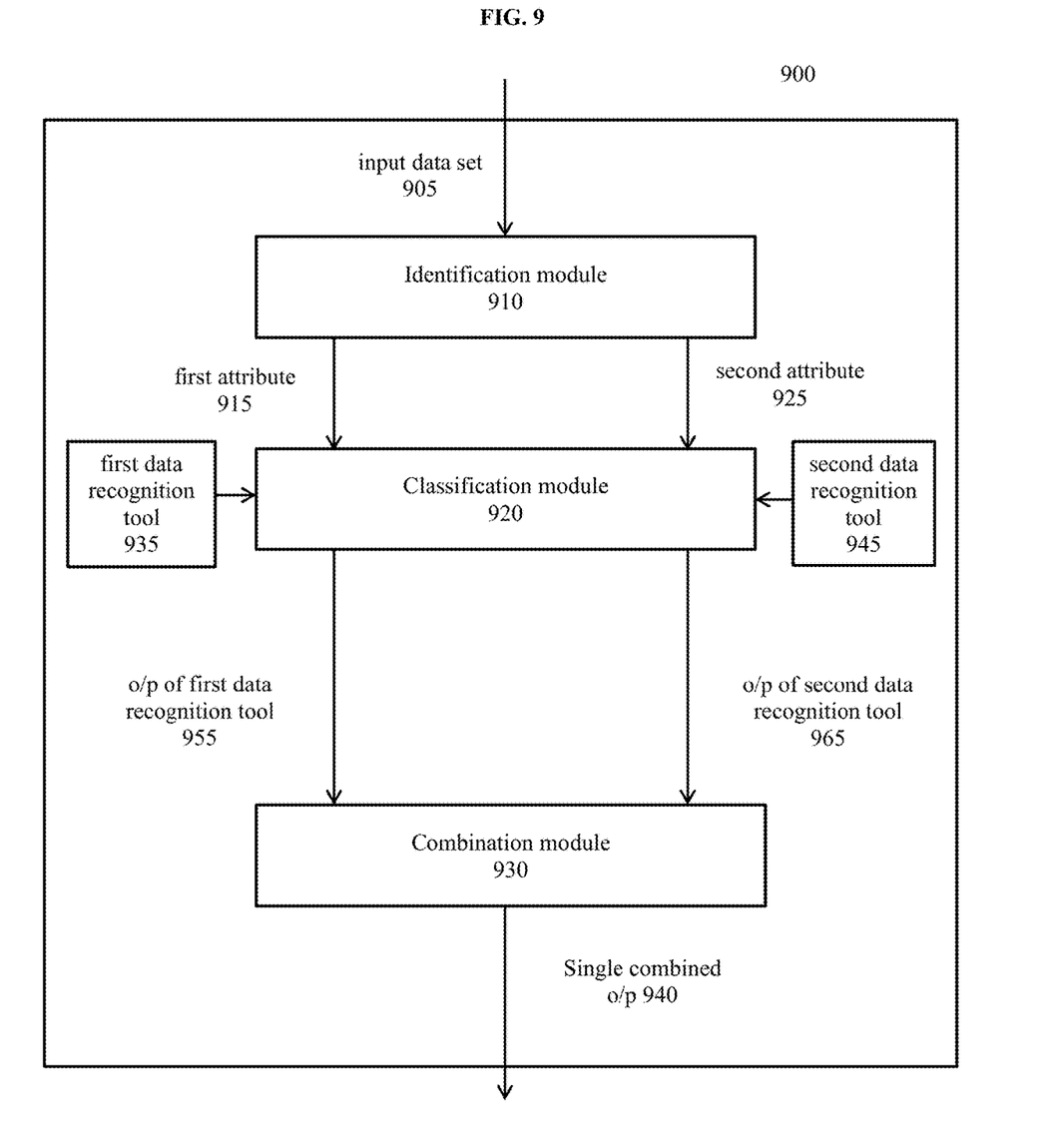
FIG. 9 shows an exemplary system for classifying an input data set within a data category using multiple data recognition tools.

FIG. 9 shows an exemplary system 900 for classifying an input data set 905 within a data category using multiple data recognition tools. In an exemplary embodiment, the system 900 can include an identification module 910 configured to identify at least a first attribute 915 and a second attribute 925 of the data category, as previously described in step 110.

In an exemplary embodiment, the system 900 can include a classification module 920 configured to classify the at least first attribute 915 via at least a first data recognition tool 935 and the at least second attribute 925 via at least a second data recognition tool 945; the classification including allocating a confidence factor that indicates a presence of each attribute in the input data set, as previously described in step 120.

In an exemplary embodiment, the system 900 can include a combination module 930 configured to combine outputs of the classifying into a single output confidence 940 by using a weighted fusion of the allocated confidence factors, as previously described in step 130. The system can include a physical data interface (e.g., a computer (AI) interface, a graphical user interface, or other physical interface) to provide the single output confidence 940.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed modules can be a hardware processor device with an associated memory.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

A hardware processor, as used herein, can be a special purpose or a general purpose processor device. The hardware processor device can be connected to a communications infrastructure, such as a bus, message queue, network, multi-core message-passing scheme, etc. An exemplary computing device, as used herein, can also include a memory (e.g., random access memory, read-only memory, etc.), and can also include one or more additional memories. The memory and the one or more additional memories can be read from and/or written to in a well-known manner. In an embodiment, the memory and the one or more additional memories can be non-transitory computer readable recording media.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory.

In an exemplary embodiment, the data can be configured in any type of suitable database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable computing device to implement the present methods as discussed herein. In particular, the computer programs stored on a non-transitory computer-readable medium, when executed, can enable hardware processor device to implement the methods illustrated by FIGS. 2 and 4, or similar methods, as discussed herein. Accordingly, such computer programs can represent controllers of the computing device.

Where the present disclosure is implemented using software, the software can be stored in a computer program product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, etc.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A computer-implemented method for identifying an image or object by classifying an input data set of attributes within a data category using multiple data recognition tools, the method comprising:
   identifying at least a first attribute and a second attribute of the data category;
   allocating, via at least a first data recognition tool for the first attribute and at least a second data recognition tool for the second attribute, a confidence factor and a quality measure for each of the first and second attributes, each confidence factor indicating a likelihood of the presence of each attribute in the input data set and each quality measure indicating a quality of the input data corresponding to each attribute;
   combining, for each of at least the first data recognition tool and at least the second data recognition tool, allocation results for each of the first attribute and the second attribute into a single output confidence score by fusing the confidence factor and quality measure allocated to each of the first and second attributes to determine a corresponding attribute confidence score for each of the first and second attributes; and
   combining the attribute confidence scores of each of the first and second attributes to determine a single combined confidence score that indicates a likelihood that the input data set has been classified correctly according to a data category.

2. The method of claim 1, wherein the allocating of the confidence factor for each of at least one of the first and second attributes is further based on a type of the first and second attributes.

3. The method of claim 1, wherein the input data set is biometric data and the data category is at least one of a facial image, a fingerprint, iris image, palm image, hand geometry, or DNA.

4. The method of claim 3, wherein the data category is a facial image and at least one of the at least first and second attributes is at least one of facial expression, pose, partial image, image contrast, illumination, tone, image pitch, pose, perspective, or other type of facial quality attributes for the facial image.

5. The method of claim 1, wherein the input data set is acoustic data and at least one of the first and second attributes is one of audio pitch, tone, loudness, timbre, or other type of acoustic quality attributes.

6. The method of claim 1, wherein the input data set is behavioral characteristics data and each data attribute is one of signal-to-noise ratio, contrast, motion blur, or other type of behavioral quality attributes.

7. The method of claim 1, wherein the input data set is a combination of acoustic data, biometric data, and behavioral characteristics data.

8. The method of claim 1, wherein the first attribute data is classified based on a logistic regression algorithm.

9. The method of claim 1, wherein the second attribute data is classified based on a neural network algorithm.

10. The method of claim 1, wherein the combining outputs comprises:
applying a multi-algorithm fusion approach.

11. The method of claim 10, wherein the multi-algorithm fusion approach is based on a logistic regression algorithm, a neural network algorithm, or a combination of logistic regression and neural network algorithms.

12. A system for identifying an image or object by classifying an input data set of attributes within a data category using multiple data recognition tools, the system comprising:
an identification module configured to identify at least a first attribute and a second attribute of the data category;
a classification module having at least a first data recognition tool for the first attribute and at least a second data recognition tool for the second attribute, the classification module configured to allocate a confidence factor and a quality measure for each of the first and second attributes, each confidence factor indicating a likelihood of the presence of each attribute in the input data set and each quality measure indicating a quality of the input data corresponding to each attribute; and
a combination module configured to:
combine, for each of at least the first data recognition tool and at least the second data recognition tool, allocation results for each of the first attribute and the second attribute into a single output confidence score by fusing the confidence factor and quality measure allocated to each of the first and second attributes to determine a corresponding attribute confidence score for each of the first and second attributes; and
combine the attribute confidence scores of each of the first and second attributes to determine a single combined confidence score that indicates a likelihood that the input data set has been classified correctly according to a data category.

13. The system of claim 12, wherein the classification module is further configured to allocate a confidence factor for at least one of the first and second attributes based on a type of the first and second attributes.

14. The system of claim 12, wherein the combination module is configured to applying a multi-algorithm fusion approach to combine outputs of the classification module into a single output confidence score.

15. The system of claim 12, wherein the combination module is configured to execute a multi-algorithm fusion approach.

16. The system of claim 15, wherein the multi-algorithm fusion approach is based on a logistic regression algorithm, a neural network algorithm, or a combination of logistic regression and neural network algorithms.

17. The system of claim 14, comprising:
a physical data interface to provide the single output confidence score.

* * * * *